(12) United States Patent
Wang et al.

(10) Patent No.: US 7,933,236 B2
(45) Date of Patent: Apr. 26, 2011

(54) METHODS AND SYSTEMS FOR A WIRELESS ROUTING ARCHITECTURE AND PROTOCOL

(75) Inventors: Guo Qiang Wang, Kanata (CA); Shiquan Wu, Nepean (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1226 days.

(21) Appl. No.: 11/481,825

(22) Filed: Jul. 7, 2006

(65) Prior Publication Data
US 2007/0097945 A1 May 3, 2007

Related U.S. Application Data

(60) Provisional application No. 60/730,763, filed on Oct. 27, 2005.

(51) Int. Cl.
*H04W 4/00* (2009.01)
(52) U.S. Cl. ........ 370/328; 370/349; 370/329; 370/331; 370/400; 370/338; 455/427
(58) Field of Classification Search ................. 370/331, 370/349, 400; 455/427
See application file for complete search history.

(56) References Cited

U.S. PATENT DOCUMENTS

| | | | |
|---|---|---|---|
| 5,950,133 A * | 9/1999 | Bledsoe | 455/439 |
| 6,778,825 B2 | 8/2004 | Parkman | |
| 2002/0012320 A1 | 1/2002 | Ogier et al. | |
| 2002/0168971 A1* | 11/2002 | Parkman | 455/427 |

(Continued)

FOREIGN PATENT DOCUMENTS
WO  WO2005/034551  4/2005

OTHER PUBLICATIONS

Johnson D. et al., "The Dynamic Source Routing Protocol for Mobile Ad Hoc Networks (DSR)", IETF MANET Working Group Internet-Draft, 1-114, Jul. 19, 2004, (http://www.ietf.org/internet-drafts/draft-ietf-manet-dsr-10.txt).

*Primary Examiner* — Kamran Afshar
*Assistant Examiner* — Khalid Shaheed

(57) ABSTRACT

The present invention provides a method for generating routing paths in a multi-hop network. The multi-hop network includes a base station, at least one relay station, and at least one non-relay mobile station. The routing paths are paths between the base station and the at least one non-relay mobile station via the at least one relay station. The base station broadcasts a path discovery message (PDM) including a path list with a starting point of the path list being the base station. Each of the relay stations receives the PDM and updates the PDM by adding their own respective node identifier to the path list and broadcasting the updated PDM. The PDMs eventually reach the non-relay mobile station. The non-relay mobile stations reply to the base station by sending the base station the updated path list between the base station and the non-relay mobile station. In some embodiments the base station or the at least one non-relay mobile station acting as a source node sends a dynamic service (DSx) message including an end-to-end path list to an end of path destination. The relay stations use the path list to forward the message between the source node and the end of path destination. In some implementations the multi-hop network operates in a manner that is consistent with any one of: IEEE 802.16, IEEE 802.16*d*, and IEEE 802.16*e*.

20 Claims, 6 Drawing Sheets

U.S. PATENT DOCUMENTS

| | | |
|---|---|---|
| 2003/0072270 A1 | 4/2003 | Guerin et al. |
| 2003/0161330 A1* | 8/2003 | Umeda ............... 370/400 |
| 2004/0170154 A1* | 9/2004 | Carter et al. ............ 370/338 |
| 2005/0135329 A1* | 6/2005 | Lee et al. ............... 370/349 |
| 2005/0201269 A1* | 9/2005 | Shim et al. ............. 370/208 |
| 2005/0232183 A1* | 10/2005 | Sartori et al. ............ 370/319 |
| 2005/0265360 A1* | 12/2005 | Kim et al. ............... 370/400 |
| 2005/0286451 A1* | 12/2005 | Kim et al. ............... 370/310 |

* cited by examiner

METHODS AND SYSTEMS FOR A WIRELESS ROUTING ARCHITECTURE AND PROTOCOL

RELATED APPLICATIONS

This application claims the benefit of U.S. Provisional Patent Application No. 60/730,763 filed on Oct. 27, 2005, which is hereby incorporated by reference in its entirety.

FIELD OF THE INVENTION

The invention relates to routing for wireless signal transmission.

BACKGROUND OF THE INVENTION

WiMAX is defined as "Worldwide Interoperability for Microwave Access" by the WiMAX Forum, which was formed in April, 2001 to promote conformance and interoperability of the IEEE 802.16 standard. WiMAX is described as "a standards-based technology enabling the delivery of last mile wireless broadband access as an alternative to cable and DSL."

One aspect of the standard provides a simple Point-to-Multi-Point (PMP) architecture. The PMP architecture includes a base station (BS) communicating over a single hop to one or more wireless mobile stations (MS). FIG. 1A shows an example of a PMP architecture in which BS 50 is in communication with MS 52 and MS 54. In an ideal case, conventional PMP transmission allows for a 50 km hop and transmission rates of approximately 30 Mbps in the direction from BS to MS and 17 Mbps in the direction from MS to BS. To provide suitable transmission over the single hop, a BS having a tall antenna with a good line of sight to the MS is typically required.

The current version of IEEE 802.16d also defines a mesh architecture. In a mesh network each node only transmits as far as an adjacent node. In a mesh network nodes can transmit data from nearby nodes to nodes that are too far away to reach in a single hop or do not have clear line of sight, resulting in a network that can span large distances. This introduces complexity to network control and resource scheduling. The current version of the IEEE 802.16d mesh network architecture is considered to be "connection-less". Connection-less mode transmission is a transmission format in which packets are provided with header information sufficient to permit delivery of the packets without additional instructions.

The mesh mode as it is currently defined in the standard is not entirely compatible with the PMP mode due to different frame structures used for transmission of messages and data in each respective mode. The two modes also have different procedures for network entry. In addition, the mesh mode does not support handoff for mobility of the MS. The mesh mode also does not support OFDMA at PHY layer.

SUMMARY OF THE INVENTION

According to a first aspect of the invention, there is provided a method for execution in a multi-hop network comprising a base station and at least one relay station for generating routing paths between the base station and at least one non-relay mobile station, the method comprising: the base station broadcasting over a first hop a path discovery message (PDM) including a path list comprising a node identifier for the base station; each relay station of the at least one relay station; receiving the PDM that was broadcast over a preceding hop, the PDM including the path list defining all preceding hops; adding a node identifier of the relay station to generate an updated path list in the PDM; and broadcasting a PDM including the updated path list over a subsequent hop; the base station receiving a reply from a given one of the at least one non-relay mobile station, the reply comprising a respective path list including node identifiers of all stations in a routing path between the base station and the non-relay mobile station inclusive, the reply being routed via relay stations identified in the respective path list.

In some embodiments when a non-relay mobile station of the at least one non-relay mobile station receives multiple PDMs, each having a different path list, from different relay stations, the at least one non-relay mobile station: determines which one of the multiple PDMs has a preferred path list based on at least one criterion characterizing the path lists of the multiple PDMs; and selects the PDM with the preferred path list to use as a routing path between the base station and the non-relay mobile station.

In some embodiments the at least one criterion is selected from a group consisting of: the shortest path between the base station and the at least one non-relay mobile station; the best determined radio performance between the base station and the at least one non-relay mobile station; a quality of service (QoS) value, or least-power-consumed link between the base station and the at least one non-relay mobile station.

In some embodiments at least one relay station or at least one non-relay mobile station determines whether a generated routing path is valid by: periodically sending a request message to the base station; and receiving a response to the request message if the routing path is still valid.

In some embodiments the method further comprises: the base station or a non-relay mobile station of the at least one non-relay mobile station sending over a first hop a service flow request message including an end-to-end path list and a connection identifier (CID) that defines the connection between the base station and the non-relay mobile station; each relay station of the at least one relay station; receiving the service flow request message that was broadcast over a preceding hop; and determining whether the message is to be forwarded over a subsequent hop or dropped based on the path list and the CID; if the message is to be forwarded, forwarding the message over a subsequent hop based on the contents of the path list and the CID.

In some embodiments the method is applied to a wireless network operating in a manner that is consistent with any one of: IEEE 802.16, IEEE 802.16d, and IEEE 802.16e.

In some embodiments the base station allocates transmission resources to each of the at least one relay stations and each of the at least one relay stations partitions the allocated transmission resources to at least one subordinate RS.

In some embodiments allocated transmission resources are at least one of: shared band and time slots with MIMO transmissions, shared band and time slots with beam-forming transmissions, adjacent band slots with MIMO transmissions, adjacent band slots with beam-forming transmissions, or different sub-channels.

In some embodiments the end-to-end path list is comprised of a list of entries, the entries each being one of node identifiers or link identifiers.

In some embodiments broadcasting a PDM by the base station or a respective relay station further comprises broadcasting an air-link-descriptor for each respective hop.

In some embodiments at least one routing path comprises more than two hops.

According to a second aspect of the invention, there is provided a method for execution in a multi-hop network comprising a base station and at least one relay station for message forwarding based on known routing paths between the base station and at least one non-relay mobile station, the method comprising: the base station or a non-relay mobile station of the at least one non-relay mobile station sending over a first hop a service flow request message including an end-to-end path list and a connection identifier (CID) that defines the connection between the base station and the non-relay mobile station; each relay station of the at least one relay station; receiving the service flow request message that was broadcast over a preceding hop; and determining whether the message is to be forwarded over a subsequent hop or dropped based on the path list and the CID; if the message is to be forwarded, forwarding the message over a subsequent hop based on the contents of the path list and the CID.

In some embodiments the service flow request message further comprises a transport CID identifying a connection between two stations over a single hop that can be used to create an entry in a forwarding table for a respective relay station to forward messages between the base station and the non-relay mobile station.

In some embodiments when the at least one relay station receives a service flow MAC PDU (media access control protocol data unit) from the direction of the base station, the relay station uses the CID of the MAC PDU to look up the forwarding table to determine whether to further broadcast the MAC PDU in the direction of the non-relay mobile station or drop the MAC PDU.

In some embodiments when the at least one relay station receives a management flow MAC PDU from the direction of the base station, the relay station checks the ownership of the CID in the forwarding table to determine whether to process the MAC PDU, further broadcast the MAC PDU in the direction of the non-relay mobile station, or drop the MAC PDU.

In some embodiments sending the service flow message comprises including a node ID list which is a path list that consists of all the stations along a selected path between the base station and at least one relay station and/or the non-relay mobile station.

In some embodiments sending the node ID list comprises sending the node ID list in a MAC sub-header.

In some embodiments the method further comprises including a air-link-descriptor for a first and subsequent hops in the MAC sub-header.

According to a third aspect of the invention, there is provided a multi-hop network adapted for communication with at least one non-relay mobile station, the network comprising: a base station; and at least one relay station being adapted to receive and forward transmissions between the base station and the at least one non-relay mobile station: wherein: the base station being adapted to broadcast over a first hop a path discovery message (PDM) including a path list with a starting point of the path list being the base station; each relay station of the at least one relay station being adapted to: receive the PDM that was broadcast over a preceding hop, the PDM including the path list defining all preceding hops; add a node identifier of the relay station to generate an updated path list in the PDM; and broadcast a PDM including the updated path list over a subsequent hop; and the base station being further adapted to receive a reply from each of the at least one non-relay mobile station, the reply comprising a respective path list including the node identifiers of all stations in the routing path between the base station and the non-relay mobile station, the reply being routed via relay stations identified in the respective path list.

In some embodiments the base station or a non-relay mobile station of the at least one non-relay mobile station sends over a first hop a service flow request message including an end-to-end path list and a connection identifier (CID) that defines the connection between the base station and the non-relay mobile station; each relay station of the at least one relay station; receives the service flow request message that was broadcast over a preceding hop; and determines whether the message is to be forwarded over a subsequent hop or dropped based on the path list and the CID; forwards the message over a subsequent hop based on the contents of the path list and the CID, if it is determined that the message is to be forwarded.

In some embodiments at each relay station a priority class identifier associated with a MAC PDU is used by the relay station to prioritize transmission order of the MAC PDU.

In some embodiments at least one of the at least one relay stations is one of: a fixed location relay station, a nomadic relay station and a mobile relay station.

In some embodiments the multi-hop network operates in a manner that is consistent with any one of: IEEE 802.16, IEEE 802.16d, and IEEE 802.16e.

According to a further aspect of the invention, there is provided a method for execution by a non-relay mobile station that is adapted to be in communication with a base station via at least one relay station, the non-relay mobile station involved with generation of a routing path between the base station and the non-relay mobile station, the method comprising: receiving a PDM that originated from the base station and was broadcast over a preceding hop from at least one relay station, the PDM including a path list defining all preceding hops; adding a node identifier of the non-relay mobile station to the path list to generate an updated path list between the base station and the non-relay mobile station; and sending the base station the updated path list, the updated path list being routed via relay stations identified in the updated path list.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF THE EMBODIMENTS OF THE INVENTION

Figure 1A:
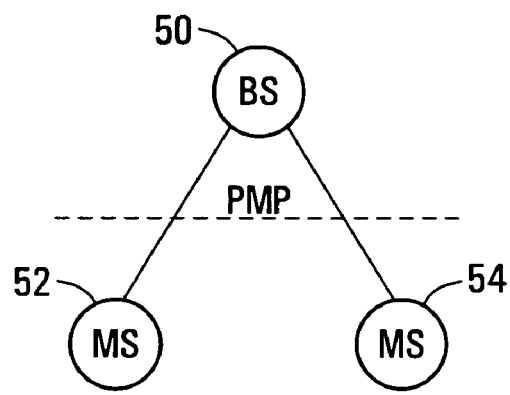
FIG. 1A is a schematic diagram of a point-to-multi-point (PMP) network architecture.

In some embodiments of the present invention there are provided protocols for use with a multi-hop network architecture. In some embodiments the multi-hop network architecture is a tree architecture. In some embodiments the multi-hop network architecture is a mesh architecture.

In the multi-hop architecture, a relay station (RS) is utilized between a base station (BS) and a mobile station (MS). Therefore, multiple hops occur between the BS and MS. Multiple RS may be located between the BS and the MS. In some implementations the multi-hop network architecture is used in addition to the single hop PMP architecture.

The RS may be installed inside of a building (e.g., subway tunnel), on a roof top of a building or a residential house, on an RS tower, on a mobile vehicle platform (e.g., trains, buses, ferries), on aerial-based platforms, or even possibly carried by soldiers in the battlefield.

Some examples of devices that may be considered to be a MS are a cellular telephone, a computer having a wireless modem, and a wireless enabled PDA (Personal Data Assistants).

In the multi-hop network architecture, there are two types of air interfaces. A first type of air interface occurs between BS and RS and between RS and RS and a second type of air interface occurs between RS and MS. The two air interfaces are either logical (they share the same radio spectrum) or physical (they may use different radio spectrum).

A first aspect of the invention provides a method for each station (BS, RS, MS) to discover adjacent neighbours automatically and to find routing paths in a dynamically changing wireless access network. A second aspect is managing end-to-end (that is BS to MS, via the intermediate RS, or vice versa) connections, otherwise referred to as data flow forwarding paths.

A BS-oriented Dynamic Source Routing (DSR) protocol is provided to enable each node (both RS and MS) to automatically generate routing paths between the BS and themselves. The protocol is considered to be BS-oriented as the BS originates the protocol by broadcasting a path discovery message (PDM). Each RS that receives the message appends its own identification to the message, which creates a path list and the forwards the message on. Each MS that receives the message sends back the complete path list to the BS, via the relay stations included in the path list. In some embodiments the BS-oriented protocol utilizes a Down Link (DL) broadcast mechanism that is a feature of the IEEE 802.16 standard, such as a DL-MAP and a centralized radio allocation technique of the PMP mode to send the path discovery message.

In some embodiments of the invention, there is provided a constraint-based signalling protocol for end-to-end connection (data flow forwarding path) management in the multi-hop topology. In some embodiments of the invention, Dynamic Service (DSx) signalling based on IEEE 802.16 is used in conjunction with a determined path list to create and manage data flow forwarding paths.

In some embodiments of the invention new MAC (media access control) layer functions are provided to implement the protocols.

The MAC layer is used to enable features in the physical (PHY) layer in an air interface architecture. A frame is a format used to transmit data over the air interface between BS and RS and/or MS. An example of a frame structure will be described below with reference to FIG. 4.

BS-oriented Dynamic Source Routing

Figure 2:
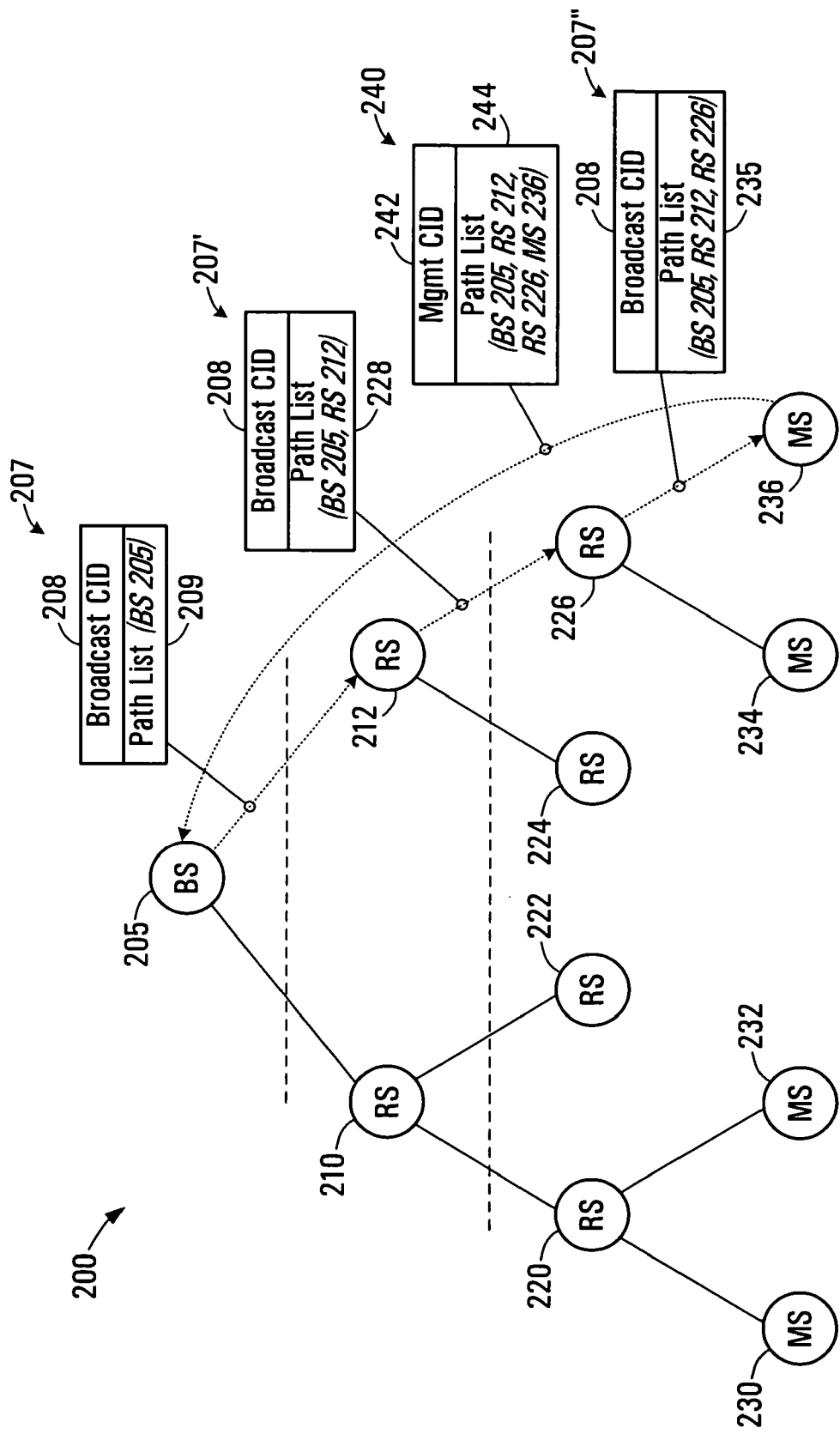
FIG. 2 is a schematic diagram of a multi-hop network architecture illustrating base station (BS) oriented route discovery according to an embodiment of the invention.

Reference to FIG. 2 will now be made in describing the BS-oriented DSR protocol.

FIG. 2 illustrates an example multi-hop network 200 including a base station 205. The base station 205 is in communication with two relay stations, namely RS 210 and RS 212. RS 210 is in communication with two relay stations, RS 220 and RS 222. RS 220 is in communication with two mobile stations, namely MS 230 and MS 232. RS 212 is in communication with two relay stations, RS 224 and RS 226. RS 226 is in communication with two mobile stations, namely MS 234 and MS 236.

FIG. 2 is one example of such a network. It is to be understood that the number of RS and MS in the network is implementation specific. Furthermore, the number of RS between BS and MS can be greater than or less than the two that are shown in FIG. 2.

In operation, BS 205 transmits broadcast messages in a frame structure to RS one hop away from the BS. The frame structure includes multiple MAC messages. The MAC messages include broadcast messages to more than one MS or messages directed to individual MS. One type of broadcast message is a path discovery message, generally indicated at 207. The path discovery message 207 includes a connection identifier (CID) for the message that is referred to as a broadcast CID 208. The broadcast CID 208 is used to indicate a connection to all MS communicating with the BS. In some embodiments the broadcast CID 208 is an efficient manner of addressing all MS by utilizing 802.16 PMP downlink transmission characteristics. In some embodiments the broadcast CID is located in a header of the path discovery message. In some embodiments, the discovery message is embedded in 802.16 broadcast control messages such as DL-MAP message. A subsequent portion of the path discovery message 207 is a path list 209. The path list 209 when transmitted by the BS 205 includes only the identification of the BS 205.

RS 212 receives the path discovery message 207 and adds its identification to the path list 209, such that updated path list 228 in the path discovery message 207' includes BS 205 and RS 212. RS 212 then broadcasts the path discovery message 207' to RS 224 and RS 226. RS 226 then repeats this process so updated path list 235 in path discovery message 207" broadcast by RS 226 includes BS 205, RS 212 and RS 226.

In some embodiments, an air-link-descriptor which describes the radio channel quality information and/or the power consumption of each RS can be associated with each entry in the path list.

MS 236 receives the path discovery message 207" and adds its own identification to path list 235 resulting in end-to-end path list 244. MS 236 sends a response back to BS 205 in a MAC message 240 with the end-to-end path list 244. The MAC message 240 includes a CID referred to as a management CID 242. The management CID 242 indicates an MS specific connection related to management of the link between the BS 205 and MS 236, as opposed to for example a connection for transport of data between the BS 205 and MS 236. In some embodiments, this response message with path list may be implemented by utilizing an uplink uni-cast message according to IEEE 802.16, such as a RNG-REQ (Ranging Request) message.

The preceding description is for discovery of the path route between BS 205 and MS 236, but it is to be understood that the same process is occurring along other path routes in the network. For example, each of the RS which receive the path discovery message from the BS in a first hop, updates the path discovery message by adding their own respective node identifier to the path list in the received path discovery message, which initially only contains the BS node identifier. The RS sends the updated path discovery message over a second hop. After each subsequent hop to either a further RS or a MS, the path discovery message received by the further RS or the MS is updated to include the node identifier of the respective station.

In some embodiments the MS may receive a path discovery message from more than one RS. The received path discovery messages each have a different path list as they have hopped along different routes to reach the MS. The MS then makes a decision as to which path list is to be selected and communicates this selection to the BS. In some embodiments this decision is made based on the number of the hops in the path list (e.g., the shortest path). In some embodiments this decision is made based on channel/power information collected from air-link-descriptor (e.g., the better quality or energy saving path).

More generally, a method for generating routing paths in a multi-hop network between a base station and at least one non-relay mobile station over multiple hops via at least one relay station can be described as follows. The base station broadcasts a path discovery message (PDM) including a path list in which a starting point of the path list is the base station. As described above, the PDM may also include the air-link quality information between the BS and RS. Each relay station of the at least one relay station receives a PDM over a preceding hop, the received PDM including the path list defining all preceding hops. Each relay station adds a node identifier of the relay station to generate an updated path list in the PDM. In some embodiments the relay stations also include the associated air-link quality information. Each relay station then broadcasts the PDM over a subsequent hop. Each of the at least one non-relay mobile station receives the PDM from a preceding hop and adds a node identifier of the non-relay mobile station to the path list to generate an updated path list between the base station and the non-relay mobile station. Each non-relay mobile station then replies to the base station by sending the updated path list between the base station and the non-relay mobile station. In some embodiments for the replay message, each relay station on the reverse path adds air-link quality information for each link back to the base station.

In some embodiments the path list is created by using link identifiers, which are links between nodes or stations (BS, RS, MS), as opposed to node or station identifiers.

The BS-oriented DSR protocol provided in some embodiments of the invention includes features for route discovery, route optimization, and route maintenance. Route discovery provides a mechanism for determining a path between the BS and MS via one or more RS as described above. Route optimization provides a mechanism for selecting an optimum route if more than one route is discovered. Route maintenance provides a mechanism for ensuring the routes that have been previously determined are still valid.

Route Discovery

The BS periodically broadcasts the path discovery message and DL bandwidth availability with a sequence number. The path discovery message is transmitted by each RS to reach the respective MS as described above. In some embodiments the path discovery message transmitted by the BS is piggybacked on a broadcast management message such as a DL-MAP provided by IEEE 802.16d. In some embodiments the response MAC message transmitted by the MS is piggybacked on a RNG-REQ (Ranging request) message as provided by IEEE 802.16d.

Route Optimization

When a MS receives multiple path discovery messages from different air links, each having a corresponding path list the MS can select a path from the multiple path discovery messages based on certain criterion. Some examples of selection criteria are a shortest path, a best radio performance, a QoS path, and an energy-saving path, such as a least-power-consumed link path. When a new path is chosen, the MS sends a MAC message to the BS reporting the selected path list. This decision may also be made on a hop-by-hop basis by each RS, depending on how air-link QoS information is acquired, distributed and stored, either globally or locally. It also depends on how radio resources are to be allocated and scheduled, for example centralized by the BS or distributed amongst the RS.

In some embodiments the MS can apply MIMO technology to utilize multi-path diversity. For example, several MS could transmit messages using collaborative MIMO (multiple input multiple output) techniques.

Route Maintenance

In some embodiments, any of the RS and/or MS periodically send RNG-REQ messages to the BS to test whether the existing routing paths are still valid. For example, the RS and/or MS sends a RNG-REQ message. If the path is still valid the BS sends back a RNG-RSP (ranging response) message. If the path is not valid, that is there is no longer a direct path along that route, the BS will not receive the RNG-REQ and therefore not send a RNG-RSP. In this case, the MS has to re-start network entry procedure to re-attach to the BS and determine a new path to the BS.

Constraint-based Dynamic Service Signalling

Figure 3:
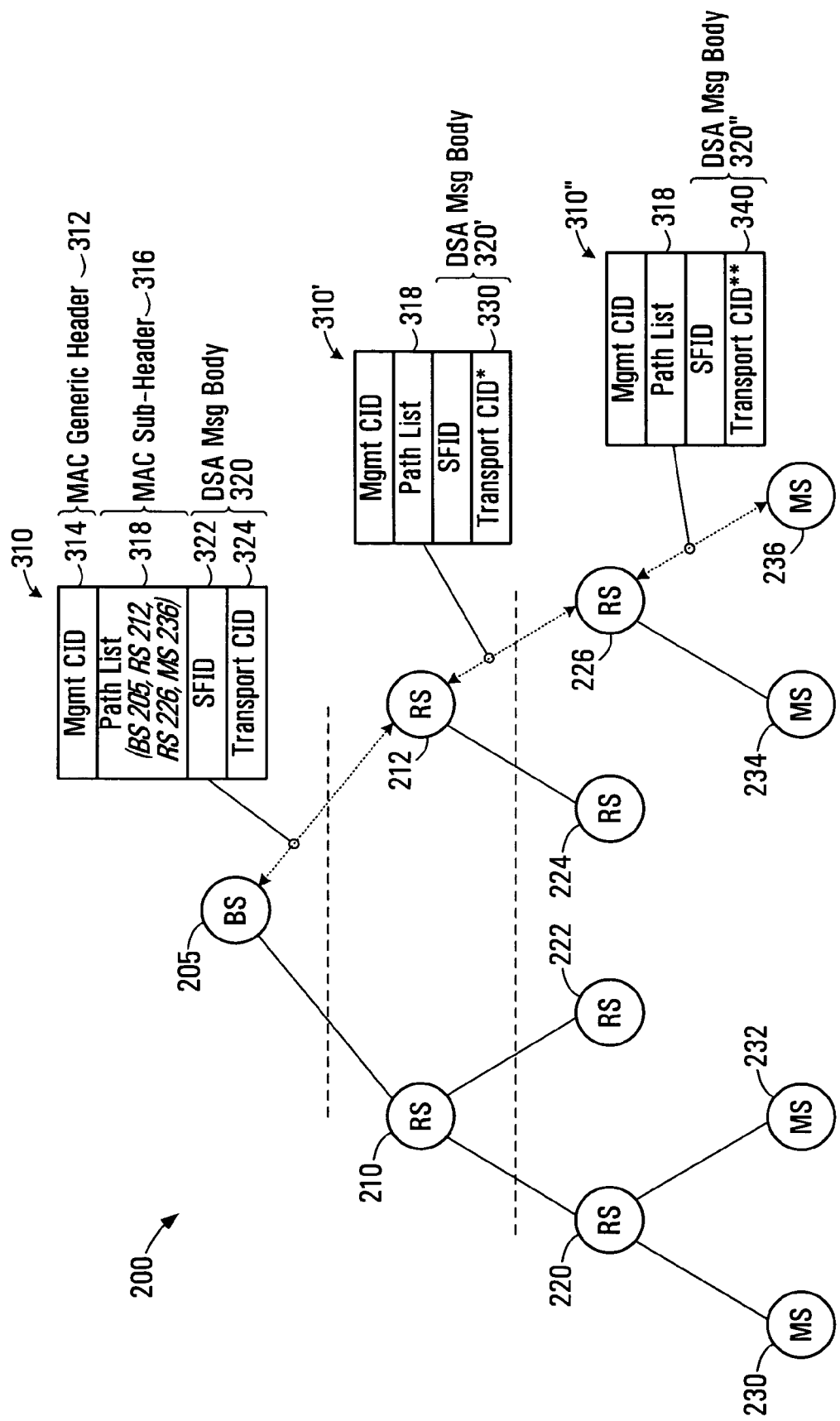
FIG. 3 is a schematic diagram of a multi-hop network architecture illustrating constraint based dynamic service signalling according to an embodiment of the invention.

Reference to FIG. 3 will now be made in describing constraint-based dynamic service signalling.

FIG. 3 illustrates the same example multi-hop network 200 that was described in FIG. 2.

When a path between the MS and the BS is known, transportation connections are created between the BS and MS for transportation of payload data. For example, the path between the BS and a specific MS may be known, but there is no data transportation or service flow currently occurring over the path. In another example, that a service flow over the path, but a further service flow is requested for the path. A first step is to establish a service flow connection between the two stations. A transport connection can be created by the BS sending a Dynamic Service Addition request (DSA-REQ) defined in 802.16d to the MS via one or more RS in the network or by the MS sending a DSA-REQ to the BS via one or more RS.

In operation, a path list identifying nodes in the network is included with the DSA-REQ message. An example of such a path list is a path list selected by the MS and provided to the BS, which is based on the BS-oriented DSR discovery protocol. However, a path list that is determined by a method other than the BS-oriented DSR discovery protocol (e.g., a pre-provisioning path) can be included with the DSA-REQ. The path list is used by one or more RS between the MS and BS to navigate from the source of the DSA-REQ to the desired destination, that is from the BS to the MS or vice versa.

The following description is for describing constraint-based service flow provisioning on the path between BS 205 and MS 236, which is originated by BS 205. It is to be understood that a similar process can be performed that originates from the MS and occurs in a reverse direction.

The BS 205 sends a frame with multiple bursts, each burst including one or more MAC messages to the MS. In the example of FIG. 3, a DSx message is part of a MAC message, indicated at 310 that includes a MAC header 312, a MAC sub-header 316 and the DSx message body. The type of DSx message illustrated in FIG. 3 is a DSA message 320. The MAC header 312 contains a management tunnel CID 314 field to identify that the connection concerns a management related aspect of the link between BS 205 and MS 236. The MAC header contains other fields as well that are not shown. An example of other fields may be those shown in FIG. 4 and described in further detail below. The MAC sub-header 316 includes a path list 318 that identifies the route between BS 205 and MS 236 as BS 205 ⇒RS 212 ⇒RS 226 ⇒MS 236. The DSA-REQ message 320 includes a service flow ID (SFID) 322 and a transport CID (Transport CID) 324. The transport CID can be considered a local CID between two stations for a single hop.

RS 212 receives the MAC message 310 and based on the path list 318 determines that the MAC message 310 should be forwarded on to RS 226. The management CID 314 is used in conjunction with the path list 318 to determine if any of the messages in the frame are to be dropped or forwarded. The management CID 314 of the message header 312 indicates that the MAC message 310 is directed to from BS 205 to MS 236. The path list 318 in the sub-header 316 for the MAC message 310 that is received by RS 212 includes both RS 212 and MS 236, so the MAC message 310 is forwarded over another hop to RS 226. Before the MAC message 310 is forwarded, the transport CID 324 is swapped, such that the MAC message 310 becomes MAC message 310' having a new local transport CID (Transport CID*) 330, which is the local CID for RS 212 to RS 226. RS 226 receives the modified MAC message 310' from RS 212. RS 226 determines from the path list 318 that the MAC message 310' should be forwarded on to MS 236. The transport CID 330 is swapped, such that MAC message 310 becomes MAC message 310" having a new local transport CID (Transport CID**) 340, which is the local CID for RS 226 to MS 236. MS 236 receives the modified MAC message 310" from RS 226.

Further details involved in swapping transport CIDs can be found in applicant's corresponding U.S. patent application No. filed on date, 2006, which is hereby incorporated by reference in its entirety.

In some embodiments, instead of using transport CIDs specific to particular station and swapping the transport CIDs for each hop, a global end-to-end transport CID can be carried in the DSx message. In this case, all the RS along the end-to-end path would simply forward DSx message to the destination MS, based on the path list from MAC sub-header.

Based on operation of PMP downlink multicasting in 802.16, not all MAC messages in a downlink frame used to transport multiple MAC message are targeted to the destination MS which is in a subordinate tree of a particular RS. In some embodiments the particular RS drops the MAC messages not targeted to the destination MS. By checking the path list in MAC sub-header, or checking the CID ownership from a routing database and CID swapping table, the particular RS determines whether to continue forwarding the MAC messages or drop the MAC messages.

In the multi-hop architecture the BS may have a larger transmission bandwidth capability than some or all of the RS. Therefore, dropping some messages from a frame when navigating from the BS to MS via one or more RS aids in mitigating bottlenecks in the network by more efficiently utilizing bandwidth available to the RS.

The same process of constraint-based service flow provisioning can be used for other types of dynamic service signalling, for example as DSD-REQ (Dynamic Service Delete request) and DSC-REQ (Dynamic Service Change request). While the DSx message has been described as a specific type of message that is used in the constraint-based service flow provisioning, more generally the message may be described as a service flow request message.

More generally, in a multi-hop network comprising a base station and at least one relay station, a method for message forwarding based on known routing paths between the base station and at least one non-relay mobile station can be described as follows. The base station or a non-relay mobile station of the at least one non-relay mobile station sends over a first hop a service flow request message including an end-to-end path list and a connection identifier (CID) that defines the connection between the base station and the non-relay mobile station. Each relay station of the at least one relay station receives the service flow request message that was broadcast over a preceding hop and determines whether the message is to be forwarded over a subsequent hop or dropped based on the path list and the CID. If the message is to be forwarded, the message is forwarded over a subsequent hop based on the contents of the path list and the CID.

In some embodiments of the constraint-based dynamic service signalling protocol, IEEE 802.16 Dynamic Service Configuration messages (DSx, where x=A, C, D for addition, change or delete, respectively) are used in conjunction with an end-to-end path list included in the MAC PDU sub-header. An example of such a sub-header is described in further detail below. The constraint-based dynamic service signalling protocol enables CID forwarding path creation, CID path management and CID path tear down for end-to-end paths. CID forwarding path creation provides a mechanism for using an established path list when creating a new service flow between the BS and MS via one or more RS as described above. CID path management provides a mechanism for maintaining a forwarding table at each RS to aid in routing flows as they pass through the RS. CID path tear down provides a mechanism for cancelling service flows when path lists have changed or become invalid as RS or MS relocate.

End-to-End CID Path Creation

In some embodiments, the BS or MS issues a DSA-REQ message to the next hop and includes the path list in the modified mesh sub-header. The path list is used to navigate between a source station and a target station, that is BS to MS or vice versa, via the one or more RS. When each RS receives the DSA-REQ message the RS determines whether to further relay the message to the next hop or drop the message, based on the path list and management CID.

End-to-End CID Path Management

In some embodiments, when DSA-REQ/DSA-RSP (Dynamic Service Addition response) messages include an allocated transport CID, each RS creates an entry in a forwarding table. The entry may contain such details as a node identifier (node ID), a first local transport CID identifying a link to a station in a preceding hop, a second transport CID identifying a station in subsequent hop, and the interface (I/F) ports associated with sending and receiving over hops of adjacent stations. If a global transport CID is allocated for end-to-end traffic by the BS, the first transport CID and the second transport CID are identical in the forwarding tables all the way from BS to RS and to MS. The forwarding table is used for data flow relay. In some embodiments management messages carry the path list in a sub-header for navigation purposes.

Once stations have created forwarding tables, the respective stations can conduct MAC layer forwarding functions such as service flow PDU forwarding and management flow PDU forwarding describe below.

End-to-End CID Path Release

In some embodiments DSD-REQ/DSD-RSP (Dynamic Service Deletion response) messages are also used to update CID allocation along the path.

For example, when the BS or MS decides to terminate a service flow, the respective BS or MS acting as a source node creates and issues a DSD-REQ. The MAC layer of the source node checks the CID of the service flow that is to be terminated against a service flow ID associated with the service flow to be terminated, and creates the DSD-REQ with the CID and the path list. The DSD-REQ is then transmitted to a RS over a first hop by the source node. Each RS along the path receives and forwards the DSD-REQ along the path. After receiving the DSD-REQ each RS along the given route looks up the mapping table and removes the correspondent entry. If the CID is allocated locally, it is returned to a local CID poll for future use. The DSD-REQ is forwarded until it reaches the last station in the path list, which is a destination node. The destination node then sends a DSD-RSP back to the source node in acknowledgement of the DSD-RSP. DSD-REQ and DSD-RSP are defined in 802.16

In service flow PDU forwarding when the RS receives a MAC PDU from a node in the direction of the MS, the RS uses the CID associated with the MAC PDU and compares the CID with the forwarding table to determine if the RS should further broadcast the PDU to a RS in the direction of the MS (or the MS itself), or drop the MAC PDU. When the RS receives a MAC PDU from a node in the direction of the MS, the RS forwards the MAC PDU to an RS in the direction of the BS (or to the BS itself).

In management flow PDU forwarding when the RS receives a MAC PDU from a node in the direction of the MS, the RS uses the CID associated with the MAC PDU and compares the CID with the forwarding table to determine whether to process the MAC PDU, as the RS is a managed object, to further broadcast the PDU to a RS in the direction of the MS (or to the MS itself), or drop the MAC PDU. When the RS receives the MAC PDU from a node the direction of the MS, the RS forwards the MAC PDU to an RS in the direction of the BS (or to the BS itself).

In some embodiments the air interface between the BS and RS is referred to as a Macro-PMP link and the air interface between the RS and MS is referred to as a Micro-PMP link. The definition of Macro-PMP and Micro-PMP refers to distributed radio resource allocation and scheduling. In Macro-PMP, the BS allocates radio channels to all RS coupled to the BS over a first hop, and also allocates some blocks or polls of radio frequencies or channels to some subordinate RS. In some embodiments the first hop RSs can further allocate radio channels from the BS allocated block/polls to subordinate trees of the first hop RSs. Such a second level allocation is referred to as Micro-PMP. Each PMP region or cell defines a broadcast domain by given radio frequency or channel. Via Macro-PMP and Micro-PMP, the end-to-end relay path can be treated as being composed of a concatenation of multiple PMP sub-paths within a multi-layer subordinate tree. In some embodiments each sub-path within a sub-tree is logically represented as a tunnel. The tunnel can have a corresponding tunnel CID. The tunnels can be used to support traffic aggregation, traffic security, traffic navigation and traffic QoS associated with Macro-PMP link and micro-PMP link.

Figure 1B:
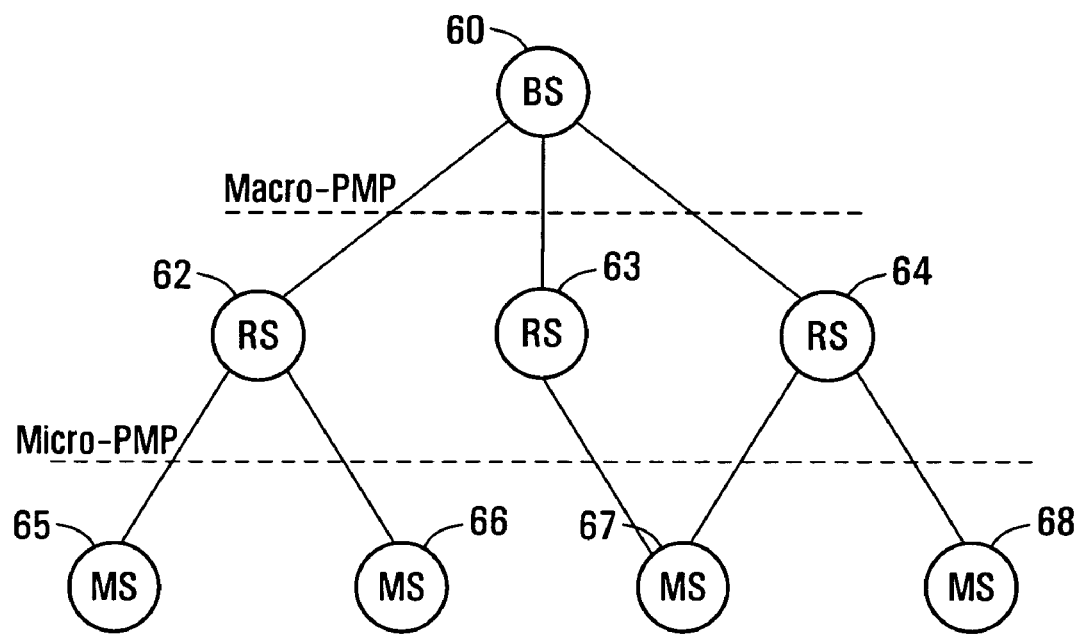
FIG. 1B is a schematic diagram of a multi-hop network architecture for use with some embodiments of the invention.

FIG. 1B shows an example of a multi-hop network architecture including BS 60 that has a Macro-PMP link with each of RS 62, RS 63 and RS 64. RS 62 has a Micro-PMP link with each of MS 65 and MS 66. RS 63 has a Micro-PMP link with MS 67. RS 64 has a Micro-PMP link with each of MS 67 and MS 68. In some embodiments the Macro-PMP links are used for transmitting broadcast messages to some or all RS from the BS or for transmitting messages to particular RS from the BS. In some embodiments the Micro-PMP links are used for transmitting broadcast messages to some or all MS from the BS via one or more RS or for transmitting messages to particular MS from the BS via one or more RS.

FIG. 1B is one example of multi-hop network architecture. It is to be understood that the number of RS and MS in the network is implementation specific and may vary from that shown in FIG. 1B. It is also to be understood that the number of MS connected to an RS is not limited to a maximum of two as shown in FIG. 1B, but the number of MS connected to an RS can be greater than two. Furthermore, a number of RS occurring between BS and MS can be greater than the one RS that is shown in FIG. 1B. As shown in FIG. 1B, an MS can be coupled to more than on RS, for example MS 67 connected to both RS 63 and 64, resulting in more than one path from BS to MS.

In some embodiments, for the Macro-PMP link, the BS allocates radio resources for transmission to each RS and for receiving transmission from each RS. In some embodiments, for the Micro-PMP link, the RS further partitions radio resources and allocates resources to the RS in the direction of the MS. This is repeated for each RS located between the BS and MS until resources are allocated for each MS. In some embodiments of the invention when allocating transmission resources, Macro-PMP and Micro-PMP schema share the same band and time slots when using MIMO transmission techniques, share the same band and time slots when using beam-forming transmission techniques, or the schema use adjacent band or different sub-channels.

In the multi-hop network architecture, the RS plays a double role. In a first role, when interacting with the MS, the RS is a master that actively coordinates with each MS the RS is associated with. In some embodiments this may include arranging cooperative MIMO transmission for capacity enhancement or transmission diversity for coverage enhancement. In a second role, when interacting with the BS, the RS is a slave that stores and forwards data packets to/from the BS.

In the multi-hop network architecture the BS has a fixed location. In some implementations the one or more RS have a fixed locations. In other implementations the one or more RS is nomadic or mobile. The MS is fully mobile-enabled. However, in some embodiments the MS may be stationary. Mobile RS and MS may relocate within the same cell. Mobile RS and MS may also relocate to other cells having a different BS. When leaving one cell and entering another, handoff may be initiated by the BS, any of the RS or the MS.

In some embodiments data traffic is distributed to a next hop via PMP air link or multiple PP (point-to-point) air interfaces when sent in a direction from the BS to the MS. Each RS determines whether to further relay the data flow along the path, or simple drop it.

In some embodiments data traffic from multiple stations, either relay or mobile is aggregated together at a next hop when sent in a direction from the MS to the BS.

In some implementations either one of or both of the BS-oriented protocol and constraint-based signalling can be applied to a conventional IEEE 802.16 relay-tree architecture and/or a conventional IEEE 802.16 mesh architecture.

The frame structure used with some embodiments of the inventions includes MAP (multiplexing access profile) information elements (IE) to provide a structure within the frame for defining where down link (DL) and up link (UL) transmission resources are located within the frame. A DL transmission resource is a time or frequency slot in the frame allocated for transmission from the BS in the direction of the MS, via one or more RS. An UL transmission resource is a time or frequency slot in the frame allocated for transmission from the MS in the direction of the BS, via one or more RS.

Figure 4:
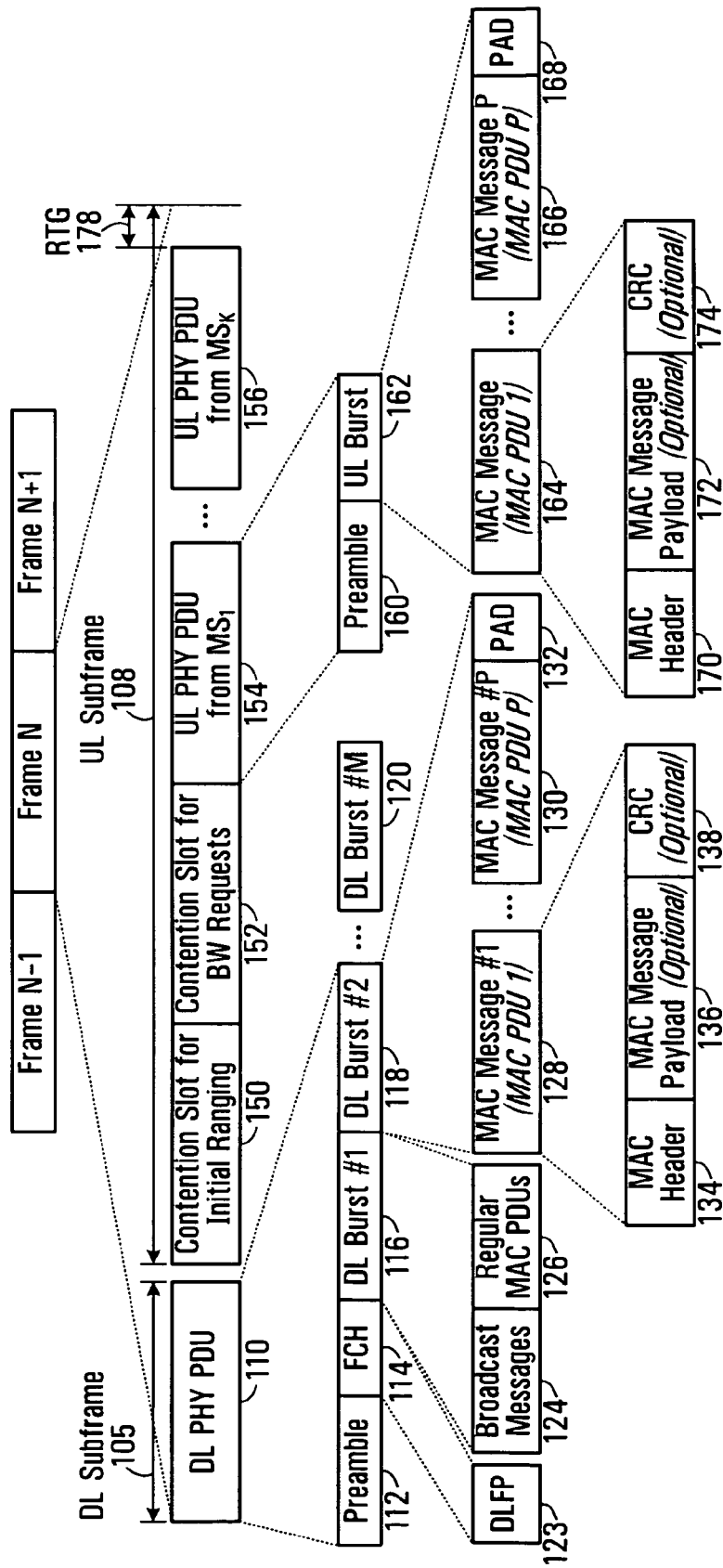
FIG. 4 is a schematic diagram of a frame used for Down link (DL) and Up link (UL) transmission in accordance with some embodiments of the invention.

By way of example, FIG. 4 shows a schematic diagram of a conventional frame structure for time division duplex (TDD) transmission used in conjunction with embodiments of the invention.

Frame N, which is preceded by Frame N−1 and followed by Frame N+1, includes a DL sub-frame 105 and an UL sub-frame 108. The DL sub-frame 105 includes a DL PHY PDU (packet data unit) 110 that has a preamble 112, a frame control header (FCH) 114 and multiple DL bursts 116, 118, 120. The FCH 114 contains the DL Frame Prefix (DLFP) 123 to specify the burst profile and the length of the DL-MAP immediately following the FCH. The DLFP is a data structure transmitted at the beginning of each frame and contains information regarding the current frame. In some embodiments the multiple DL bursts (1 to M) 116, 118, 120 each have different modulation and coding. In other embodiments, some or all of the DL bursts have the same modulation and coding. A first DL burst 116 contains broadcast messages 124 to be broadcast to all RS and MS including DL MAP and UL MAP IEs (not shown). If the broadcast messages 124 do not occupy an entire allocated time duration for the first DL burst 116, MAC PDU messages 126 directed to one or more individual MS may fill the remainder of the time duration. In some embodiments the broadcast messages may use more than a single DL burst. However, a shorter broadcast message means that more data and less overhead can be transmitted in the frame. Subsequent DL bursts 118, 120 include multiple MAC PDU messages (1 to P) 128, 130 directed to one or more individual MS. In some embodiments the DL bursts include padding 132. Each MAC PDU message contains a MAC header 134. The MAC PDU message may also include a MAC message payload 136 and cyclic redundancy check (CRC) 138 as shown in FIG. 2. The CRC 138 is used for error detection. The broadcast messages 124 also contains a MAC header. Each MAC PDU message may also be assigned a sequence number that can be used for purposes such as maintaining an ordered sequence at the receiver and/or aiding in retransmission of MAC PDU messages that were not received.

The UL sub-frame 108 shown in FIG. 4 includes a contention slot 150 for initial ranging requests, which is a time duration for multiple MS communicating with the BS to contend for time in finalizing synchronization of the respective MS with the network. The UL subframe 108 also includes a contention slot 152 for bandwidth (BW) requests, which is a time duration for the multiple MS communicating with the BS to contend for UL resources for transmission of data from the MS to the BS. The UL subframe 108 also includes multiple UL PHY PDUs 154, 156 which are the up link resources used by each respective source MS (1 to K) to communicate with the BS. Each UL PHY PDU 154, 156 includes a preamble 160 and an UL burst 162. The UL burst 162 is transmitted using a modulation and coding specific to the source MS. The UL burst 162 includes multiple MAC PDU messages (1 to P) 164, 166. In some embodiments the UL burst 162 includes padding 168. Each MAC PDU message 164, 166 contains a MAC header 170. The MAC PDU message 164, 166 may also include a MAC message payload 172 and CRC 174. Following the UL sub-frame 108 is a receive/transmit transition guard (RTG) 178.

FIG. 4 is an example frame that can be used in accordance with the invention. In some embodiments the frame structure may not include all the described components of FIG. 2, for example a frame structure may not include both described contention slots, or may include additional slots to allow contending for other reasons. Furthermore, a frame structure may have other additional guard slots such as a transmit/receive transition guard (TTG) located between the DL subframe 105 and UL sub-frame 108. While the frame of FIG. 4 is substantially consistent with the frame structure established for IEEE 802.16, the use of other frame structures may be considered within the scope of the invention if capable of supporting the BS-oriented protocol and constraint-based signalling as described herein.

In some embodiments frames N−1 and N+1 have a similar structure. In other embodiments, frames in the sequence are a mixture of frames, some having a similar structure and others having different structure.

Frames enabling frequency division duplex (FDD) communication and combined TDD/FDD communication are also both considered to be within the scope of the invention.

As described above MAC PDUs include MAC headers. The MAC header can be used to transmit data or MAC messages. There are two common forms or MAC header, a generic MAC header and a bandwidth request MAC header. MAC PDUs may also contain a MAC sub-header that is typically located subsequent to the MAC header.

802.16d MAC Sub-header Extension

In 802.16d, a MAC PDU is composed of MAC header and MAC PDU body. The MAC header is fixed in size while the MAC PDU body can be variable size. In the multi-hop architecture a route between the BS and MS includes multiple hops via one or more RS. In some embodiments of the invention a sub-header is provided that includes a node ID list, which is the path list of all the nodes along the selected path between BS and MS.

An example of a sub-header will now be described with regard to FIG. 5. Fields of a generic MAC header are collectively indicated at 400. The numbers in brackets in each field indicate a number of bytes in the field.

The feedback header 400 includes a "Header Type (HT)" field 401, an "Encryption Control (EC)" field 402, a "Type" field 403, a "Extended Subheader Format Reserved (ES-FRSV)" field 404, a "CRC indicator (CI)" field 405, an "encryption key sequence (EKS)" field 406, another "RSV" field 407, a "Length (Len)" field 408, a "CID" field 409 and a "Header Check Sequence (HCS)" field 410. "HT" field 401 indicates the type of header. "Type" field 403 indicates sub-headers and special payload types present in the message payload. The "RSV" fields 404, 407 are reserved for variable use, which allows flexibility in the use of these fields. "Len" field 408 is the length in bytes of the MAC PDU including the MAC header and the CRC if present. In some embodiments values to be used in the different fields can be found in the IEEE 802.16 standard.

When used with some embodiments of the invention, the CID field 409 in the generic MAC header 400 is a tunnel CID. The tunnel CID can be considered a global CID between the BS and a specific RS or MS. Depending on whether the radio resource is allocated in a centralized or distributed manner, in some embodiments the tunnel CID is allocated by the BS and in some embodiments the tunnel CID is allocated by the RS. In some embodiments the tunnel CID is a management tunnel CID that is used for signalling associated with managing a connection. In some embodiments the tunnel CID is a transport tunnel CID that is used for forwarding of data over a connection.

The sub-header is indicated at 415. The sub-header includes a listing of n Node (or station) IDs that form the path list from the BS to a given MS. The sub-header 415 is also shown to include fields for a CID Stack 422, priority class 424, a Sequence number 426, and an air-link-descriptor 428. In some embodiments the air-link-descriptor includes current radio channel and/or air link quality information. In some embodiments the air-link-descriptor includes power consumption information. In some embodiments the priority class field 424 contains an identifier that is used to determine the priority of contents of a forwarded message with respect to other forwarded messages. The priority class field allows the RS to prioritize the order for forwarding messages.

In some embodiments the fields for CID Stack 422, priority class 424, Sequence number 426 and air-link-descriptor 428 are optional fields. Therefore, in some embodiments some or all of these fields may not be included in the sub-header.

For example, in some embodiments when the generic MAC header and sub-header are used for a Path Discovery Message, the sub-header may include only the path list. In some embodiments the Path Discovery Message may also include optional fields such as an air-link-descriptor and sequence number. As the Path Discovery Message is transmitted downstream, for each new node, an identifier of that new node is added into path list of the PDM.

In some embodiments, when the sub-header is used in conjunction with a DSx signalling message, the sub-header may only contain the path list, to be used for navigation purpose. In some embodiments, when the sub-header is used for normal payload MAC PDU transmission, the sub-header may contain CID stack and priority class information.

Figure 5:
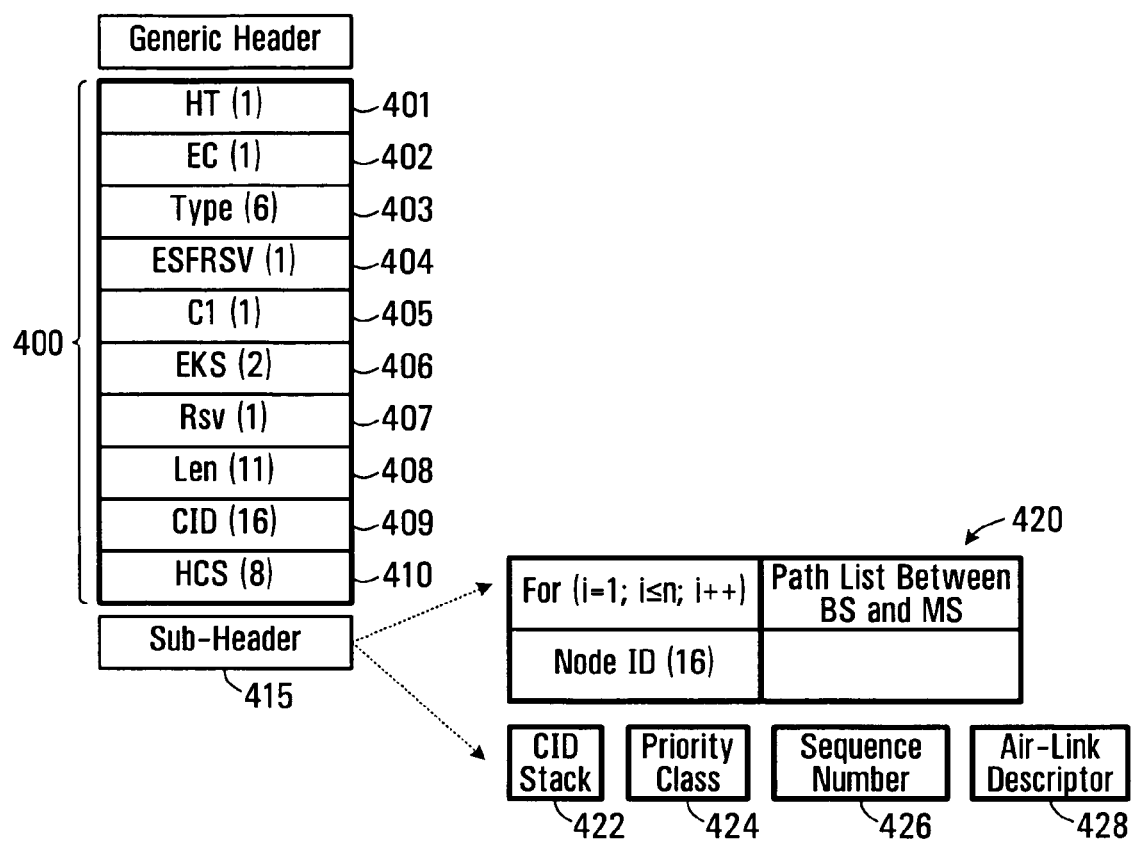
FIG. 5 is a schematic diagram of an example of a modified MAC (media access control) sub-header for use with some embodiments of the invention.

FIG. 5 is one example of a generic MAC header that those skilled in the art may be familiar with according to IEEE 802.16. In some embodiments there may be a greater or lesser number of fields in each of the generic MAC header and sub-header, respectively that that which are shown in FIG. 5. Furthermore, the MAC header fields may have a different number of bytes than indicated in FIG. 5. More generally, it is to be understood that a MAC header having a different layout but performing substantially the same task could be used in conjunction with the sub-header.

Figure 6:
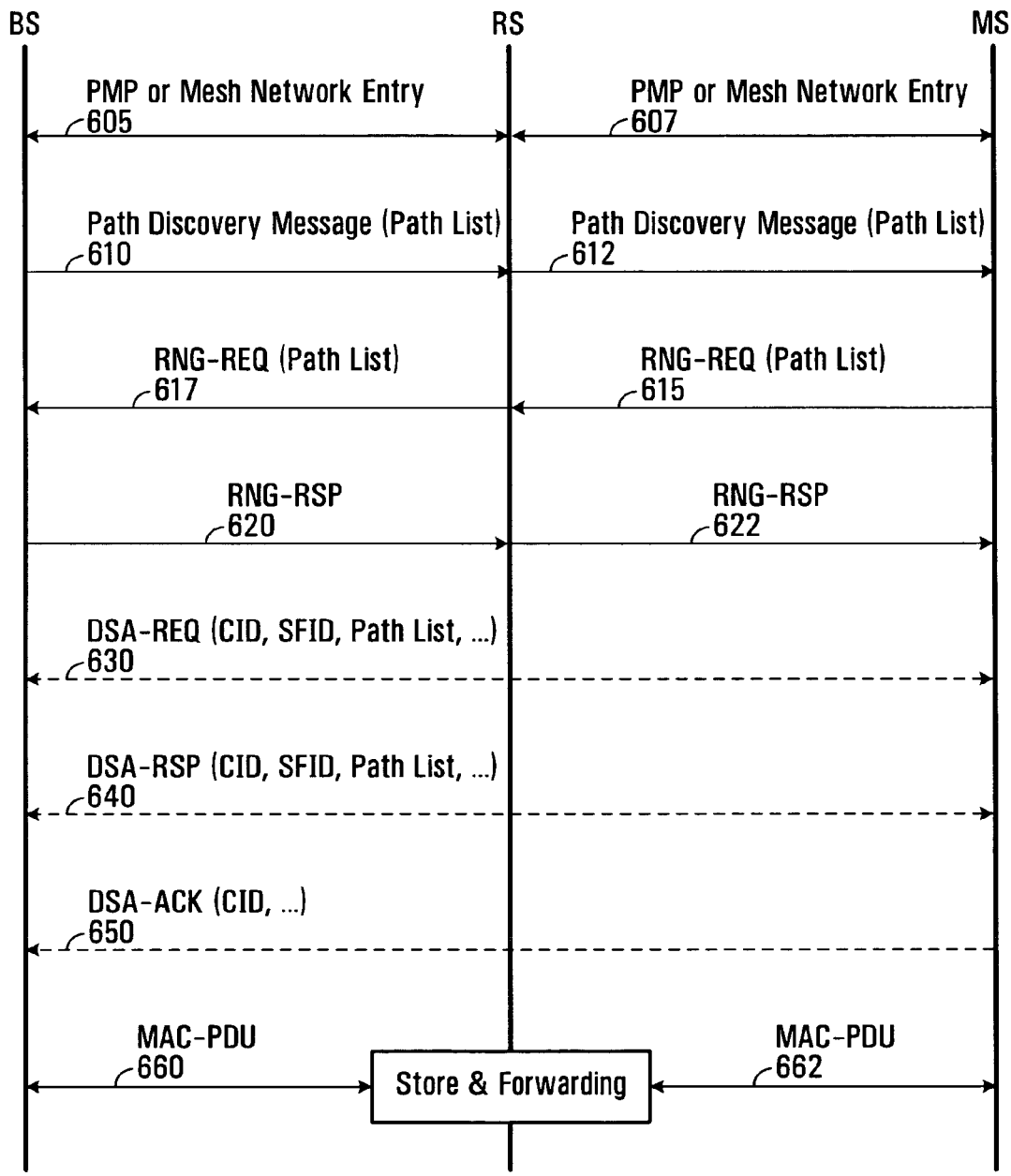
FIG. 6 is a signalling flow diagram illustrating operation of the multi-level relay network architecture according to an embodiment of the invention.

FIG. 6 will now be used to describe an example of signalling flow between BS, RS and MS for entry of the RS and MS into the network, determination of the path list, and PDU forwarding.

The RS enters the network either using a conventional PMP entry method if the RS is adjacent to the BS or using a mesh entry method if the RS is not adjacent to the BS as indicated at 605. The MS enters the network via the conventional PMP entry method as it is adjacent to an RS as indicated at 607. The BS sends a path discovery message 610 to the RS as described above as part of the path discovery protocol. The RS forwards the path discovery message 612 to the MS. The MS responds by sending the completed path list to the RS as a portion of a RNG-REQ (ranging request) message 615 and the RS forwards the RNG-REQ to the BS 617. The BS sends a RNG-RSP (ranging response) to the RS 620 which is forwarded on to the MS 622 by the RS. While the main purpose of the RNG-RSP is for the MS to connect with the network, it also acts to confirm the routing path is correct between the BS and the MS. Step 630 shows a double arrowhead line indicating that either the BS or the MS can act as the source that initiates sending a DSA-REQ message to a destination for creating an end-to-end flow path. At step 640 the destination then sends a DSA-RSP to the source. At step 650 the source sends a DSA-ACK to acknowledge the DSA-RSP. Steps 660 and 662 illustrate implementation of 1) end-to-end management in the storing of information and 2) service and management flow PDU forwarding in the forwarding of MAC-PDU messages in UL and DL directions.

In some embodiments the invention provides solutions for end-to-end data packet delivery in a WiMAX (IEEE 802.16) tree and/or mesh network topologies. In some embodiments the invention supports multi-hop relay for data distribution/aggregation between BS and MS with tree and/or mesh topologies, which extends access coverage and achieves better traffic throughput and performance. In some embodiments the invention can be applied to fixed, nomadic and mobile RS relay topology. Furthermore, in some embodiments, aspects of the invention are backward compatible with existing IEEE 802.16d/16e standards with only a minor extension in the current interface definition.

In some implementations the invention is based on well-understood Ad hoc network routing technology and IEEE 802.16 dynamic service provisioning capability. In some embodiments the multi-hop architecture can be applied to both of multi-layer PMP radio tree and/or mesh networks and multiple Point-to-Point air link tree and/or mesh networks.

In some embodiments the multi-hop architecture and associated protocols used in conjunction with the architecture enable one or more of the following benefits:

increased coverage of radio transmission and longer transmission range;

better utilization of radio resource allocation and reduced interference;

enhanced system capacity and performance compared to known IEEE 802.16 architecture and protocols;

improved MS battery life; and lower cost system deployment.

Numerous modifications and variations of the present invention are possible in light of the above teachings. It is therefore to be understood that within the scope of the appended claims, the invention may be practised otherwise than as specifically described herein.

The invention claimed is:

1. A method for execution in a multi-hop network comprising a base station and at least one relay station for generating routing paths between the base station and at least one non-relay mobile station, the method comprising:

the base station broadcasting over a first hop a path discovery message (PDM) including a path list comprising a node identifier for the base station and a broadcast connection identifier (CID) identifying that the PDM is broadcast for all of the at least one non-relay mobile station being served by the base station;

each relay station of the at least one relay station:

receiving the PDM that was broadcast over a preceding hop, the PDM including the path list defining all preceding hops and the broadcast CID;

adding a node identifier of the relay station to generate an updated path list in the PDM; and broadcasting a PDM including the updated path list over a subsequent hop;

the base station receiving a reply message from each of the at least one non-relay mobile station, the reply message comprising a path list including node identifiers of all stations in a routing path between the base station and the non-relay mobile station inclusive and a management connection identifier (CID) for identifying that a link between the respective non-relay mobile station and the base station defined by the routing path is specific to management of the link, the reply being routed via relay stations identified in the respective path list.

2. The method of claim 1, wherein when a non-relay mobile station of the at least one non-relay mobile station receives multiple PDMs, each having a different path list, from different relay stations, the at least one non-relay mobile station:

determining which one of the multiple PDMs has a preferred path list based on at least one criterion characterizing the path lists of the multiple PDMs; and selecting the PDM with the preferred path list to use as a routing path between the base station and the non-relay mobile station.

3. The method of claim 2, wherein the at least one criterion is selected from a group consisting of: the shortest path between the base station and the at least one non-relay mobile station; the best determined radio performance between the base station and the at least one non-relay mobile station; a quality of service (QoS) value, and least-power-consumed link between the base station and the at least one non-relay mobile station.

4. The method of claim 1, wherein at least one relay station or at least one non-relay mobile station determines whether a generated routing path is valid by:
periodically sending a request message to the base station; and
receiving a response message to the request message if the routing path is still valid.

5. The method of claim 1 further comprising:
the base station or a non-relay mobile station of the at least one non-relay mobile station sending over a first hop a service flow request message including an end-to-end path list and the management CID that defines the connection between the base station and the non-relay mobile station;
each relay station of the at least one relay station;
receiving the service flow request message that was broadcast over a preceding hop; and
determining whether the message is to be forwarded over a subsequent hop or dropped based on the path list and the management CID;
if the message is to be forwarded, forwarding the message over a subsequent hop based on the contents of the path list and the management CID.

6. The method of claim 5, wherein the method is applied to a wireless network operating in a manner that is consistent with any one of: IEEE 802.16, IEEE 802.16d, and IEEE 802.16e.

7. The method of claim 5, wherein the base station allocates transmission resources for at least one relay station coupled to the base station by the first hop, and relay stations coupled by subsequent hops allocate transmission resources to subordinate relay stations.

8. The method of claim 5, wherein the end-to-end path list is comprised of a list of entries, the entries each being one of node identifiers or link identifiers.

9. The method of claim 1 wherein broadcasting a PDM by the base station or a respective relay station further comprises broadcasting an air-link-descriptor for each respective hop.

10. A method for execution in a multi-hop network comprising a base station and at least one relay station for message forwarding based on known routing paths between the base station and at least one non-relay mobile station, the method comprising:
the base station or a non-relay mobile station of the at least one non-relay mobile station sending over a first hop a service flow request message including an end-to-end path list and a management connection identifier (CID) that is specific to management of the end-to-end path that defines the connection between the base station and the non-relay mobile station;
each relay station of the at least one relay station:
receiving the service flow request message that was broadcast over a preceding hop; and
determining whether the message is to be forwarded over a subsequent hop or dropped based on the path list and the management CID;
if the message is to be forwarded, forwarding the message over a subsequent hop based on the contents of the path list and the management CID.

11. The method of claim 10, wherein the service flow request message further comprises a transport CID identifying a connection between two stations over a single hop that can be used to create an entry in a forwarding table for a respective relay station to forward messages between the base station and the non-relay mobile station.

12. The method of claim 11, wherein when the at least one relay station receives a service flow MAC PDU (media access control protocol data unit) from the direction of the base station, the relay station uses a CID associated with the MAC PDU to look up the forwarding table to determine whether to further broadcast the MAC PDU in the direction of the non-relay mobile station or drop the MAC PDU.

13. The method of claim 11, wherein when the at least one relay station receives a management flow MAC PDU from the direction of the base station, the relay station checks the ownership of the CID in the forwarding table to determine whether to process the MAC PDU, further broadcast the MAC PDU in the direction of the non-relay mobile station, or drop the MAC PDU.

14. The method of claim 10, wherein sending the service flow message comprises including a node ID list which is a path list that consists of all the stations along a selected path between the base station and at least one relay station and/or the non-relay mobile station.

15. The method of claim 14 wherein sending the node ID list comprises sending the node ID list in a MAC sub-header.

16. The method of claim 15 further comprising including at least one of a CID stack, a priority class identifier, a sequence number and an air-link-descriptor in the MAC sub-header for the first and subsequent hops.

17. A multi-hop network adapted for communication with at least one non-relay mobile station, the network comprising:
a base station; and
at least one relay station adapted to receive and forward transmissions between the base station and the at least one non-relay mobile station:
wherein:
the base station being adapted to broadcast over a first hop a path discovery message (PDM) including a path list with a starting point of the path list being the base station and a broadcast connection identifier (CID) identifying that the PDM is broadcast for all of the at least one non-relay mobile station being served by the base station;
each relay station of the at least one relay station being adapted to:
receive the PDM that was broadcast over a preceding hop, the PDM including the path list defining all preceding hops and the broadcast CID;
add a node identifier of the relay station to generate an updated path list in the PDM; and
broadcast a PDM including the updated path list over a subsequent hop; and
the base station being further adapted to receive a reply message from each of the at least one non-relay mobile station, the reply message comprising a path list including the node identifiers of all stations in the routing path between the base station and the non-relay mobile station and a management connection identifier (CID) for identifying that a link between the respective non-relay mobile station and the base station defined by the routing path is specific to management of the link, the reply being routed via relay stations identified in the respective path list.

18. The multi-hop network of claim 17 wherein:
the base station or a non-relay mobile station of the at least one non-relay mobile station sends over a first hop a service flow request message including an end-to-end path list and the management CID that defines the connection between the base station and the non-relay mobile station;

each relay station of the at least one relay station:
  receives the service flow request message that was broadcast over a preceding hop; and
  determines whether the message is to be forwarded over a subsequent hop or dropped based on the path list and the management CID;
  forwards the message over a subsequent hop based on the contents of the path list and the management CID, if it is determined that the message is to be forwarded.

19. The multi-hop network of claim 17, wherein at each relay station a priority class identifier associated with a MAC PDU is used by the relay station to prioritize transmission order of the MAC PDU.

20. The multi-hop network of claim 17, wherein the multi-hop network operates in a manner that is consistent with any one of: IEEE 802.16, IEEE 802.16d, and IEEE 802.16e.

* * * * *